United States Patent
Wang et al.

(10) Patent No.: US 9,204,369 B2
(45) Date of Patent: Dec. 1, 2015

(54) ENHANCED NODE B AND METHOD FOR CONFIGURING AN EXTENSION CARRIER

(75) Inventors: Ping Wang, Beijing (CN); Jong-Kae Fwu, Sunnyvale, CA (US); Huaning Niu, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 13/992,959

(22) PCT Filed: Dec. 28, 2011

(86) PCT No.: PCT/US2011/067622
§ 371 (c)(1),
(2), (4) Date: Nov. 5, 2013

(87) PCT Pub. No.: WO2012/134579
PCT Pub. Date: Oct. 4, 2012

(65) Prior Publication Data
US 2014/0050127 A1    Feb. 20, 2014

Related U.S. Application Data (60) Provisional application No. 61/471,042, filed on Apr. 1, 2011.

(51) Int. Cl.
*H04J 3/00* (2006.01)
*H04W 48/10* (2009.01)
(Continued)

(52) U.S. Cl.
CPC ............ *H04W 48/10* (2013.01); *H04B 7/0456* (2013.01); *H04B 7/0486* (2013.01); *H04B 7/0632* (2013.01); *H04B 7/0639* (2013.01); *H04L 5/003* (2013.01); *H04L 5/0037* (2013.01); *H04L 5/0094* (2013.01); *H04L 25/0206* (2013.01); *H04L 25/0226* (2013.01); *H04L 25/03343* (2013.01); *H04L 43/50* (2013.01); *H04L 45/70* (2013.01); *H04L 65/608* (2013.01);
(Continued)

(58) Field of Classification Search
None
See application file for complete search history.

(56) References Cited

U.S. PATENT DOCUMENTS

2011/0080885 A1    4/2011  Shin et al.
2011/0103243 A1*   5/2011  Larsson et al. ................. 370/252

FOREIGN PATENT DOCUMENTS

CN          103583006 A        2/2014
WO    WO-2012134579 A1        10/2012

OTHER PUBLICATIONS

"International Application Serial No. PCT/US2011/067622, International Search Report mailed Jul. 30, 2012", 5 pgs.
(Continued)

*Primary Examiner* — Afshawn Towfighi
(74) *Attorney, Agent, or Firm* — Schwegman Lundberg & Woessner, P.A.

(57) ABSTRACT

An apparatus and method for providing configuration information relating to an extension carrier within a wireless communications network is disclosed herein. In one embodiment, each enhanced node B (eNodeB) transmits the configuration information within the downlink subframes of at least one radio frame, wherein the configuration information is transmitted on the downlink shared channel (DL-SCH) included in the radio frame. In another embodiment, each eNodeB transmits the configuration information within a radio resource control (RRC) signaling included in at least one radio frame to select ones of the user equipments (UEs) in response to the system load relative to the select UE's request.

26 Claims, 5 Drawing Sheets

(51) Int. Cl.

| | | |
|---|---|---|
| H04B 7/04 | (2006.01) | |
| H04B 7/06 | (2006.01) | |
| H04L 25/02 | (2006.01) | |
| H04W 24/10 | (2009.01) | |
| H04W 24/00 | (2009.01) | |
| H04W 52/18 | (2009.01) | |
| H04W 72/04 | (2009.01) | |
| H04L 29/06 | (2006.01) | |
| H04W 52/14 | (2009.01) | |
| H04W 24/02 | (2009.01) | |
| H04W 28/08 | (2009.01) | |
| H04L 5/00 | (2006.01) | |
| H04L 12/26 | (2006.01) | |
| H04L 12/721 | (2013.01) | |
| H04W 4/00 | (2009.01) | |
| H04W 48/12 | (2009.01) | |
| H04W 52/02 | (2009.01) | |
| H04L 25/03 | (2006.01) | |
| H04W 28/04 | (2009.01) | |
| H04W 72/00 | (2009.01) | |
| H04W 88/02 | (2009.01) | |
| H04W 88/08 | (2009.01) | |
| H04W 92/20 | (2009.01) | |

(52) U.S. Cl.
CPC ............ *H04W 4/005* (2013.01); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 72/0453* (2013.01); *H04L 5/005* (2013.01); *H04L 25/0328* (2013.01); *H04L 2025/03426* (2013.01); *H04L 2025/03802* (2013.01); *H04W 28/048* (2013.01); *H04W 72/00* (2013.01); *H04W 88/02* (2013.01); *H04W 88/08* (2013.01); *H04W 92/20* (2013.01)

(56) References Cited

OTHER PUBLICATIONS

"International Application Serial No. PCT/US2011/067622, Written Opinion mailed Jul. 30, 2012", 4 pgs.

CMCC, "Operations of Extension Carriers in CA", 3GPP TSG RAN WG2 Meeting #68, R2-096983, (Nov. 2009), 9-13.

Etri, "SI for Extension Carrier", 3GPP TSG RAN WG2 Meeting #68, R2-096517, (Nov. 2009), 9-13.

Motorola, "Extension carrier operation", 3GPP TSG RAN WG2 Meeting #68, R2-096875, (Nov. 2009), 9-13.

Samsung, "Discussion on the extension carrier operation", 3GPP TSG RAN WG2 Meeting #68, R2-096908, (Nov. 2009), 9-13.

"International Application Serial No. PCT/US2011/067622, International Preliminary Report on Patentability mailed Oct. 10, 2013", 6 pgs.

Miki, Nobuhiko, et al., "CA for Bandwidth Extension in LTE-Advanced", NTT DOCOMO Technical Journal, 12(2)., [online]. Retrieved from the Internet: <URL: http://www.nttdocomo.co.jp/english/binary/pdf/corporate/technology/rd/technical_journal/bn/vol12_2/vol12_2_010en.pdf>, (Sep. 2010), 10 pgs.

* cited by examiner

ENHANCED NODE B AND METHOD FOR CONFIGURING AN EXTENSION CARRIER

CROSS-REFERENCE TO RELATED APPLICATIONS

This application is a U.S. National Stage Filing under 35 U.S.C. 371 from International Application No. PCT/US2011/067622, filed Dec. 28, 2011 and published in English as WO 2012/134579 on Oct. 4, 2012, which claims priority to U.S. Provisional Patent Application No. 61/471,042 entitled "Advanced Wireless Communication Systems and Techniques" filed on Apr. 1, 2011, the contents of which are incorporated herein by reference in their entireties.

TECHNICAL FIELD

The present disclosure relates generally to wireless communications. More particularly, the present disclosure relates to configuring an extension carrier within wireless communication systems.

BACKGROUND

In the current 3rd Generation Partnership Project (3GPP) long term evolution (LTE)-Advanced systems, carrier aggregation (CA) is used to extend communication bandwidths of 1.4, 3, 5, 10, 15, and up to 20 megaHertz (MHz) in Release 8/9 and up to 100 MHz in Release 10. Such large bandwidth communication is achieved by the simultaneous aggregation of more than one component carrier, hence the term carrier aggregation, in which each carrier within the aggregated set of carriers is referred to as a component carrier. Under Release 10, up to five component carriers may be aggregated together to achieve the maximum bandwidth of 100 MHz.

Two types of carriers are discussed in Release 8/9/10: backwards compatible carrier in Release 8/9 and non-backwards compatible carrier in Release 8/9. (See 3GPP TS 36.300 Version 10.4.0, E-UTRA Overall Description (Release 10), June 2011.) A backwards compatible carrier comprises a carrier accessible to user equipments (UEs) of all LTE releases (e.g., earlier releases such as Release 8/9 as well as the current release). A non-backwards compatible carrier comprises a carrier that is not accessible to UEs of LTE Release 8/9, but is accessible to UEs of Release 10 that defines such a carrier. Each of the backward compatible carrier and the non-backwards compatible carrier can operate as a stand-alone carrier or as part of CA as a component carrier. A stand-alone carrier comprises a carrier than can be used alone without other carriers to provide communication between UEs and enhanced Node Bs (eNodeBs or eNBs). A stand-alone carrier can provide the channels and signals of all the physical layers used by the LTE-Advanced system (e.g., physical downlink control channel (PDCCH), physical hybrid automatic repeat request (HARQ) indicator channel (PHICH), physical control format indicator channel (PCFICH), downlink synchronization signals, downlink reference signals, etc.).

An extension carrier, by contrast, comprises a carrier that cannot operate alone and instead must be part of CA set (must be a component carrier within a component carrier set of the CA), in which at least one of the other component carriers in the component carrier set is a stand-alone capable carrier. The extension carrier may be used as extended elements of the stand-alone capable carrier that is already configured or connected to the UEs. Extension carriers typically lack physical layer control channels or signals information or have limited broadcast capabilities compared to stand-alone carriers. For example, extension carriers may not include any physical layer control channels, such as PDCCH, PHICH, or PCFICH, or lack various control signals information such as downlink synchronization signals or downlink reference signals. The missing information and/or capabilities of an extension carrier may be provided by the stand-alone capable carrier within the CA.

Current LTE-Advanced systems (Release 8/9/10) do not support extension carriers. Future releases may benefit from using extension carriers enhance the network efficiency for providing service (on an as-needed basis) in environments or operating conditions where additional service coverage is warranted.

DETAILED DESCRIPTION

The following description is presented to enable any person skilled in the art to create and use a computer system configuration and related method and article of manufacture to provide configuration information relating to an extension carrier within a wireless communications network. Each enhanced node B (eNodeB) transmits the configuration information within the downlink subframes of at least one radio frame. In one embodiment, the configuration information is provided in a downlink shared channel (DL-SCH) included in the radio frame. In another embodiment, each eNodeB provides the configuration information within a radio resource control (RRC) signaling included in the radio frame to select ones of the user equipments (UEs) in response to the system load relative to the selected UE's request.

Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figure 1:
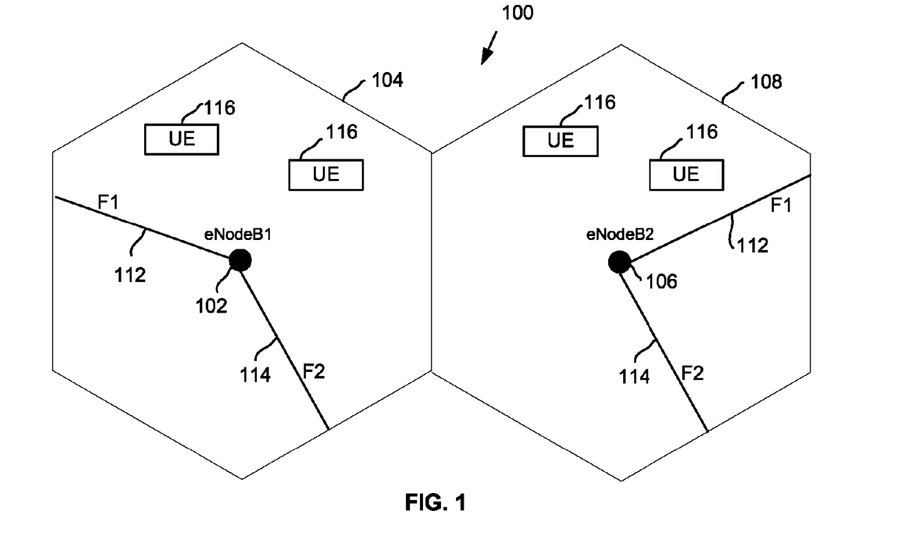
FIG. 1 illustrates an example (portion) of a wireless communications network according to some embodiments.

FIG. 1 illustrates an example (portion) of a wireless communications network 100 according to some embodiments.

In one embodiment, the wireless communications network 100 comprises an evolved universal terrestrial radio access network (EUTRAN) using the 3rd Generation Partnership Project (3GPP) long term evolution (LTE) standard. The wireless communications network 100 includes a first enhanced Node B (eNodeB or eNB) 102, a second eNodeB 106, and a plurality of user equipments (UEs) 116.

The first eNodeB 102 (also referred to as eNodeB1 or a first base station) serves a certain geographic area, denoted as a first cell 104. The UEs 116 located within the first cell 104 are served by the first eNodeB 102. The first eNodeB 102 communicates with the UEs 116 on a first carrier frequency 112 (F1) and optionally, one or more secondary carrier frequencies, such as a second carrier frequency 114 (F2). In one embodiment, the first carrier frequency 112 may be associated with a stand-alone capable carrier and the second carrier frequency 114 may be associated with an extension carrier, in which the stand-alone capable carrier and the extension carrier are included in a component carrier set of carrier aggregation (CA).

The second eNodeB 106 is similar to the first eNodeB 102 except that it serves a different cell from that of the first eNodeB 102. The second eNodeB 106 (also referred to as eNodeB2 or a second base station) serves another certain geographic area, denoted as a second cell 108. The UEs 116 located within the second cell 108 are served by the second eNodeB 106. The second eNodeB 106 communicates with the UEs 116 on the first carrier frequency 112 (F1) and optionally, one or more secondary carrier frequencies, such as the second carrier frequency 114 (F2).

The UEs 116 may comprise a variety of devices configured to communicate within the wireless communications network 100 including, but not limited to, cellular telephones, smart phones, tablets, laptops, desktops, personal computers, servers, personal digital assistants (PDAs), web appliances, set-top box (STB), a network router, switch, bridge, and the like.

It is understood that the wireless communications network 100 includes more than two eNodeBs. It is also understood that each of the first and second eNodeBs 102, 106 can have more than one neighboring eNodeB. As an example, the first eNodeB 102 may have six or more neighboring eNodeBs. The first and second cells 104, 108 may or may not be immediately co-located next to each other. One or more of the UEs 116 served by the first eNodeB 102 may move over time from the first cell 104 to the second cell 108, in which case the second eNodeB 106 takes over from the first eNodeB 10 (e.g., first eNodeB 102 performs hand-off operations with the second eNodeB 106 for those UEs 116).

Figure 2:
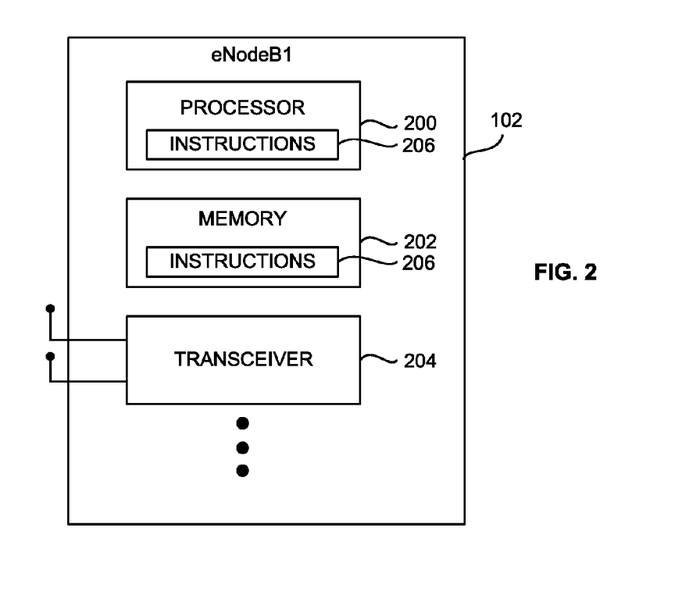
FIG. 2 illustrates an example block diagram showing details of an eNodeB included in the wireless communications network of FIG. 1 according to some embodiments.

FIG. 2 illustrates an example block diagram showing details of the first eNodeB 102 according to some embodiments. The second eNodeB 106 is similarly configured. The first eNodeB 102 includes a processor 200, a memory 202, a transceiver 204, instructions 206, and other components (not shown). The processor 200 comprises one or more central processing units (CPUs), graphics processing units (GPUs), or both. The processor 200 provides processing and controlling functionalities for the first eNodeB 102. The memory 202 comprises one or more transient and static memory units configured to store instructions, data, setting information, and the like for the first eNodeB 102. The transceiver 204 comprises one or more transceivers configured to receive uplink receptions and transmit downlink transmissions with the UEs 116 within range of the first eNodeB 102. The transceiver 204 includes a multiple-input and multiple-output (MIMO) antenna to support MIMO communications.

The instructions 206 comprise one or more sets of instructions or software executed on a computing device (or machine) to cause such computing device (or machine) to perform any of the methodologies discussed herein. The instructions 206 (also referred to as computer- or machine-readable instructions) may reside, completely or at least partially, within the processor 200 and/or memory 202 during execution thereof. The processor 200 and memory 202 also comprise machine-readable media. In one embodiment, the processor 200 executes the instructions 206 to cause operations associated with configuring an extension carrier for a given eNodeB with one or more UEs (e.g., the first eNodeB 102 with UEs 116) to implement use of that extension carrier within the wireless communications network 100.

Each of the UEs 116 also includes one or more processor, memory, transceiver, instructions, and other components similar to that shown in FIG. 2. These components of any of the UEs 116 operate to be on the receiving end or complimentary to the configuration actions and information of the first eNodeB 102.

Each of the first and second eNodeBs 102, 106 can be configured to communicate with respective UEs 116 using one, two, or more carriers, such as, but not limited to, up to five component carriers. In one embodiment, the component carriers within a component carrier set of the CA may comprise one or more backwards compatible carriers and/or one or more non-backwards compatible carriers that is a stand-alone capable carrier and at least one extension carrier. Configuration schemes for implementing an extension carrier in the wireless communications network 100 are described below.

A backwards compatible carrier comprises a carrier accessible to UEs 116 of all LTE releases (e.g., earlier releases such as Release 8/9 as well as the current Release 10). A non-backwards compatible carrier comprises a carrier that is not accessible to UEs 116 of earlier LTE Release 8/9, but is accessible to UEs 116 of the release that defines such a carrier. Each of the backward compatible carrier and the non-backwards compatible carrier can operate as a stand-alone carrier or as part of CA as a component carrier. A stand-alone carrier comprises a carrier than can be used alone without other carriers to provide communication between UEs 116 and at least one of the first and second eNodeBs 102, 106. A stand-alone carrier can provide the channels and signals of all the physical layers used by the LTE-Advanced system (e.g., physical downlink control channel (PDCCH), physical hybrid ARQ indicator channel (PHICH), physical control format indicator channel (PCFICH), downlink synchronization signals, downlink reference signals).

An extension carrier comprises a carrier that cannot operate alone and instead must be part of CA set (must be a component carrier within a component carrier set of the CA), in which at least one of the other component carriers in the component carrier set is a stand-alone capable carrier. The extension carrier may be used as extended elements of the stand-alone capable carrier that is already configured or connected to the UEs 116. Extension carriers typically lack control channels or signals information or have limited broadcast capabilities compared to stand-alone carriers. For example, extension carriers may not include any physical layer control channels, such as PDCCH, PHICH, or PCFICH, or lack various control signals information used for channel status information or synchronization. The missing information and/or capabilities of an extension carrier may be provided by the stand-alone capable carrier within the CA.

In one embodiment, configuration of an extension carrier for a given eNodeB is implemented using downlink cell-specific control signals/channels included in downlink subframes of one or more radio frames. The UEs 116 located in the first cell 104 transmit data to the first eNodeB 102 (uplink transmission) and receive data from the first eNodeB 102 (downlink transmission) using radio frames comprising Orthogonal Frequency-Division Multiple Access (OFDMA) frames configured for time division duplex (TDD) operations or frequency division duplex (FDD) operations. Each of the radio frames comprises a plurality of uplink and downlink subframes, the uplink and downlink subframes configured in accordance with the uplink-downlink ratio configuration selected from among the supported uplink-downlink ratio configurations. (See 3GPP TS 36.211 Version 9.1.0, E-UTRA Physical Channels and Modulation (Release 9), March 2010.)

The downlink subframes of at least one radio frame (also referred to as a downlink radio subframes) in accordance with a broadcast time period for the first eNodeB 102 includes one or more of the following downlink broadcast channel and control channels/signals (also referred to as downlink control signals, downlink control channels/signals, control channels/signals, control channels, or control signals):

Downlink primary/secondary synchronization signal (PSS/SSS), used for the initial cell search and frame synchronization.

Primary broadcast channel (PBCH), which provides essential cell-specific system configuration information.

Physical control format indicator channel (PCFICH), which informs the UEs 116 about the number of orthogonal frequency division multiple access (OFDMA) symbols used for the PDCCHs.

Physical downlink control channel (PDCCH), which informs the UEs 116 about the resource allocation of the paging channel (PCH), downlink shared channel (DL-SCH), or carries the uplink scheduling grant.

Physical hybrid ARQ indicator channel (PHICH), which carries the hybrid ARQ acknowledge (ACK)/not acknowledge (NAKs) in response to uplink shared channel (UL-SCH) transmissions.

Paging channel (PCH) broadcasts the paging information in the entire coverage area of the cell 104.

Downlink reference signals include the cell-specific reference signals (CRS), multicast-broadcast signal frequency network (MBSFN) reference signal, UE-specific reference signals (DM-RS), positioning reference signals (PRS), and channel state information (CSI) reference signals (CSI-RS).

(See 3GPP TS 36.211 Version 10.3.0, E-UTRA Physical Channels and Modulation (Release 10), September 2011.)

System information provided to the UEs 116 from the first eNodeB 102 is divided into the MasterInformationBlock (MIB) and a plurality of SystemInformation Blocks (SIBs). The MIB includes a limited number of essential and most frequently transmitted parameters used to acquire other information from the first cell 104. The MIB is transmitted on a broadcast channel (BCH). The plurality of SIBs includes SystemInformationBlockType1 (SIB1), SystemInformationBlockType2 (SIB2), SystemInformationBlockType3 (SIB3), etc. SIBs other than SIB1 are carried in SystemInformation (SI) messages. The mapping of SIBs to SI messages can be flexibly configured by a "schedulingInfoList" field included in SIB1 in accordance with the following rules: (1) each SIB is only included in a single SI message, (2) only SIBs having the same scheduling requirement (e.g., same periodicity) may be mapped to the same group of SI messages, and (3) SIB2 is mapped to the SI message that corresponds to the first entry in the list of SI messages in the "schedulingInfoList" field included in SIB1. One or more SI messages can be transmitted for a given periodicity. All of the SIBs (SystemInformationBlockType1 and SystemInformationBlockType2, 3, 4, etc. contained in SI messages) are transmitted on the DL-SCH. Additional details pertaining to the system information are provided in 3GPP TS 36.331 Version 10.2.0, E-UTRA Radio Resource Control (RRC): Protocol Specification (Release 10), June 2011.

Figure 3:
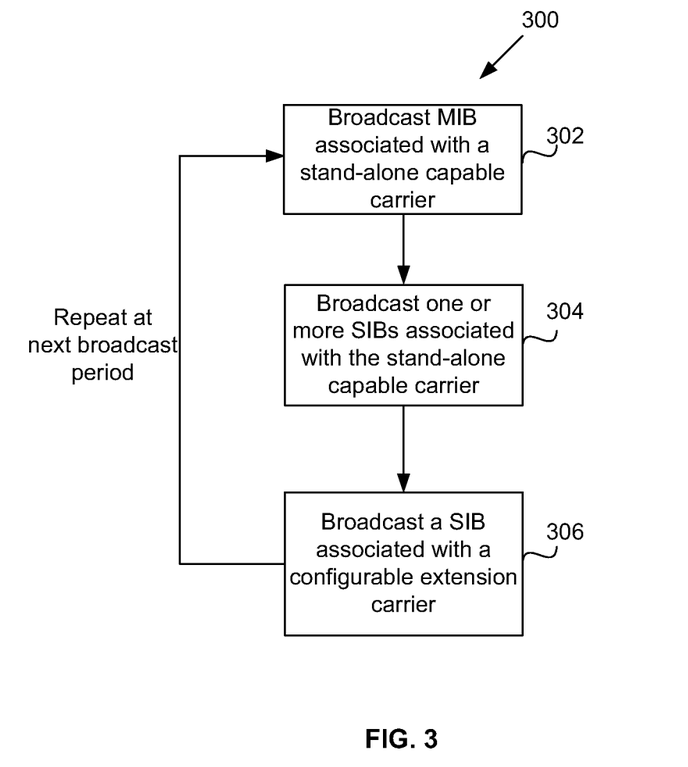
FIG. 3 illustrates an example flow diagram for configuring an extension carrier using SystemInformationBlock (SIB) type information included in at least one radio frame according to some embodiments.
Figure 4:
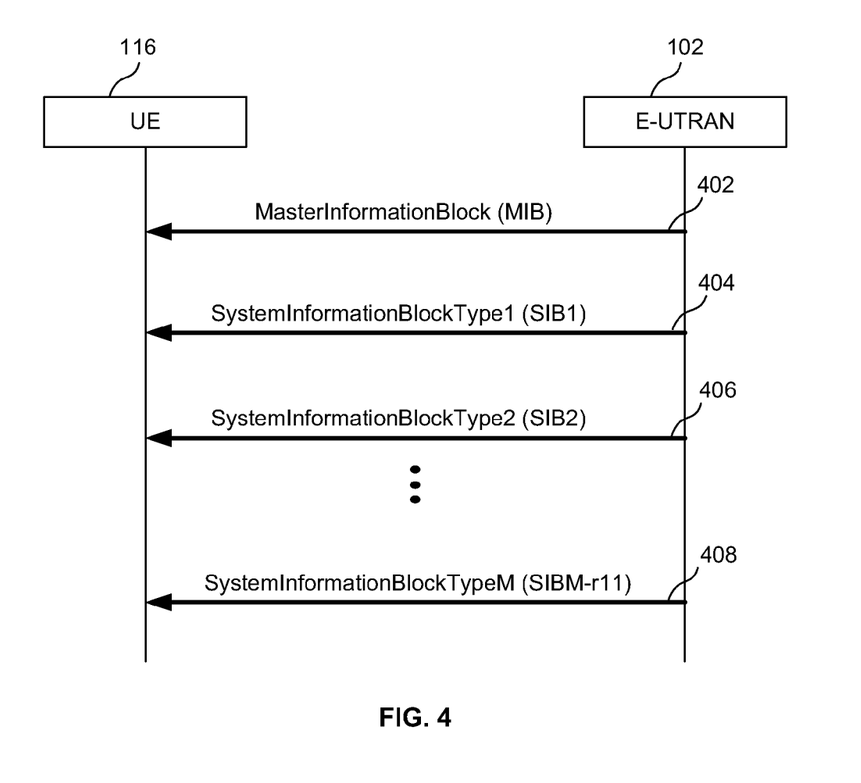
FIG. 4 illustrates an example timing diagram relating to the flow diagram of FIG. 3 according to some embodiments.

FIG. 3 illustrates an example flow diagram 300 for configuring an extension carrier for the first eNodeB 102 using SystemInformationBlock (SIB) type information included in at least one radio frame according to some embodiments. FIG. 4 illustrates an example timing diagram relating to the flow diagram 300 according to some embodiments. FIG. 3 is described below in conjunction with FIG. 4.

At a block 302, the first eNodeB 102 broadcasts the MIB associated with a stand-alone capable carrier (e.g., first carrier frequency 112) to the UEs 116 within the first cell 104 (communication 402). The MIB is included in a BCH, and the BCH, in turn, comprises part of the downlink control channels/signals for the first eNodeB 102. The downlink control channels/signals are included in at least one radio frame (e.g., included within the downlink subframes of the at least one radio frame) in accordance with a broadcast time period. These radio frame(s) are transmitted by the first eNodeB 102 to the UEs 116.

Next at a block 304, the first eNodeB 102 broadcasts one or more SIBs associated with the stand-alone capable carrier (e.g., operating at the first carrier frequency 112) to the UEs 116 within the first cell 104 (communications 404, 406). SIB1 (communication 404) and SIB2, SIB3, etc. (communication 406) can be provided to UEs 116. The SIBs are included in the DL-SCH, and the DL-SCH, in turn, comprises part of the downlink control channels/signals for the first eNodeB 102. These downlink control channels/signals are included in at least one radio frame (e.g., included within the downlink subframes of the at least one radio frame) in accordance with the broadcast time period. The radio frame(s) including MIB or the SIBs are broadcasted to a plurality of UEs 116 at the respective pre-determined broadcast time period.

At a block 306, the first eNodeB 102 broadcasts a new (or special or additional) SIB type information relating to a configurable extension carrier to the UEs 116 (on the first carrier frequency 112) within the first cell 104 (communication 408). The new or special SIB is referred to as SystemInformationBlockTypeM (SIBM or SIBM-r11). SIBM comprises a dedicated SIB relating to the configurable extension carrier. As with SIB2, SIB3, etc. (the SIBs type information that are not SIB1) discussed above, SIBM is similarly encoded within a SI message. The SIBM type information is included in the DL-SCH, and the DL-SCH, in turn, comprises part of the downlink control channels/signals (in particular, the downlink system information transmitted in downlink share channels (PDSCH)) for the first eNodeB 102. These relevant SIBs included in PDSCH are transmitted in at least one radio frame (e.g., included within the downlink subframes of the at least one radio frame) in accordance with the broadcast time period. The radio frames(s) containing such downlink control channels/signals are transmitted by the first eNodeB 102 to the UEs 116. The radio frames(s) including the MIB and/or other SIBs are broadcast to a plurality of UEs 116 at the respective pre-determined broadcast time period.

For instance, SIBM can be specified within the existing "SystemInformation Message" field within the "schedulingInfoList" field of SIB1. An example "SystemInformation Message" including specification of the new or additional SIBM is provided below. Additional details pertaining to the existing SystemInformation Message is provided in 3GPP TS 36.331 Version 10.2.0, E-UTRA Radio Resource Control (RRC): Protocol Specification (Release 10), June 2011.

```
craticalExtensions            CHOICE {
    systemInformation-r2                   SystemInformation-r3-IEs,
    craticalExtensionsFuture  SEQUENCE {{
  }
}
SystemInformation-r3-IEs ::=  SEQUENCE }
sib-TypeAndInfo                        SEQUENCE (SIZE (1..maxSIB)) OF
                                       CHOICE {
    sib2                               SystemInformationBlockType2,
    sib3                               SystemInformationBlockType3,
    sib4                               SystemInformationBlockType4,
    sib5                               SystemInformationBlockType5,
    sib6                               SystemInformationBlockType6,
    sib7                               SystemInformationBlockType7,
    sib8                               SystemInformationBlockType8,
    sib9                               SystemInformationBlockType9,
    sib10                              SystemInformationBlockType10,
    sib11                              SystemInformationBlockType11,
    ...,
    sib12-v920                         SystemInformationBlockType12-r9,
    sib13-v920                         SystemInformationBlockType13-r9
    stbM-r11                           SystemInformationBlockTypeM-r11
},
nonCriticalExtension          SystemInformation-v8a0IEs  OPTIONAL
}
SystemInformation-v8a0-IEs :: = SEQUENCE {
lateNonCraticalExtension      OCTET STRING               OPTIONAL,
                                                         -- Need OF
nonCraticalExtension          SEQUENCE { }               OPTIONAL
                                                         -- Need OF
}
-- ASNISTOP
```

With the new/additional/special SIBM specified within SystemInformation Message, the SIBM can be generated to provided configuration information indicating the presence or absence of each of the downlink control channels/signals (PSCH, SSCH, PBCH, PCFICH, PDCCH, PHICH, PCH, CRS, PRS, and CSI-RS) of the particular extension carrier. This set of downlink control channels/signals information is also cell-specific (e.g., the first cell 104) and is broadcast on the primary/anchor cell (e.g., first carrier frequency 112), as is MIB and other SIBs (communications 402, 404, 406). As example SIBM type information is provided below.

```
-- ASNISTART
SystemInformationBlockType M ::=  SEQUENCE {
    sCellIndex-r11                SCellIndex-r11,
    extensionCarrier-PSCH-r11     BOOLEAN,
    extensionCarrier-SSCH-r11     BOOLEAN,
    extensionCarrier-PBCH-r11     BOOLEAN,
    extensionCarrier-PCFICH-r11   BOOLEAN,
    extensionCarrier-PDCCH-r11    BOOLEAN,
    extensionCarrier-PHICH-r11    BOOLEAN,
    extensionCarrier-PCH-r11      BOOLEAN,
    extensionCarrier-CRS-r11      BOOLEAN,
    extensionCarrier-PRS-r11      BOOLEAN,
    extensionCarrier-CSI-RS-r11   BOOLEAN
    ...
}
-- ASNISTOP
```

Blocks 302-306 are repeated each broadcast period of the first eNodeB 102. Broadcast periods (also referred to as broadcast time periods or pre-determined time periods) can include, but is not limited to, an integer multiple of 80 ms. Accordingly, the UEs 116 served by the first eNodeB102 are provided configuration information about an extension carrier, and one or more of the UEs 116 can connect to the extension carrier using the provided configuration information. Enabling support of LTE configurable extension carriers improves, among other things, network efficiency and/or performance.

Figure 5:
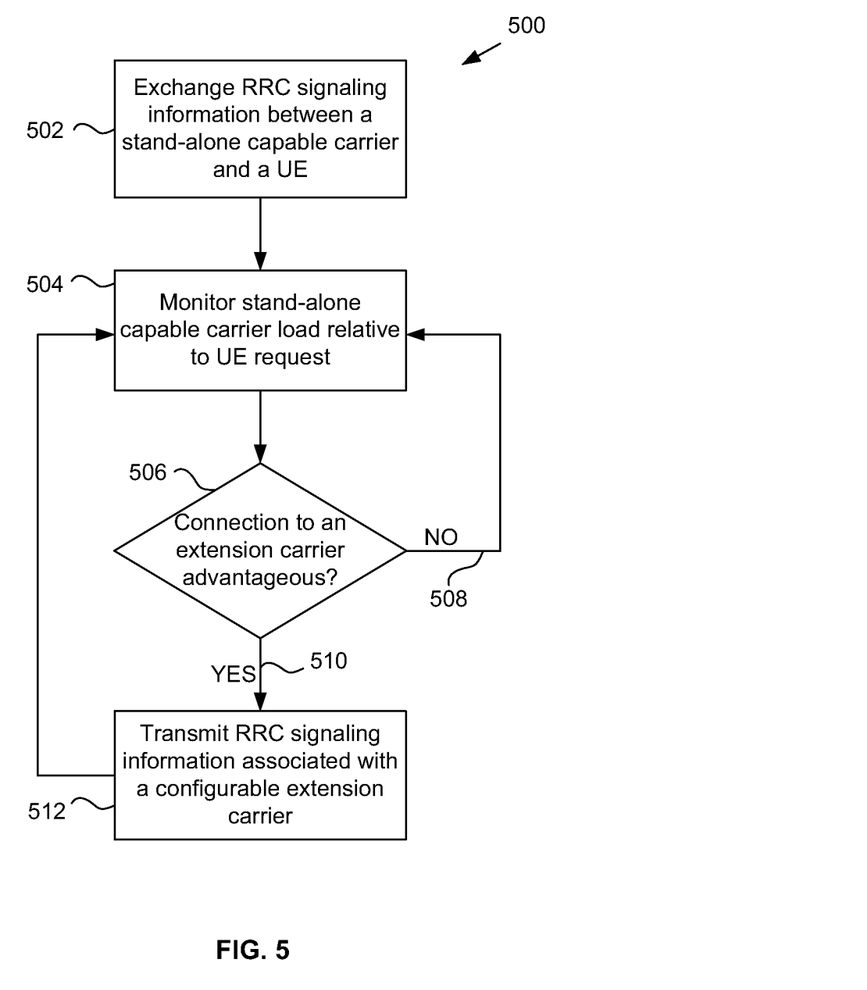
FIG. 5 illustrates an example flow diagram for configuring an extension carrier using RRC dedicated signaling according to some embodiments.
Figure 6:
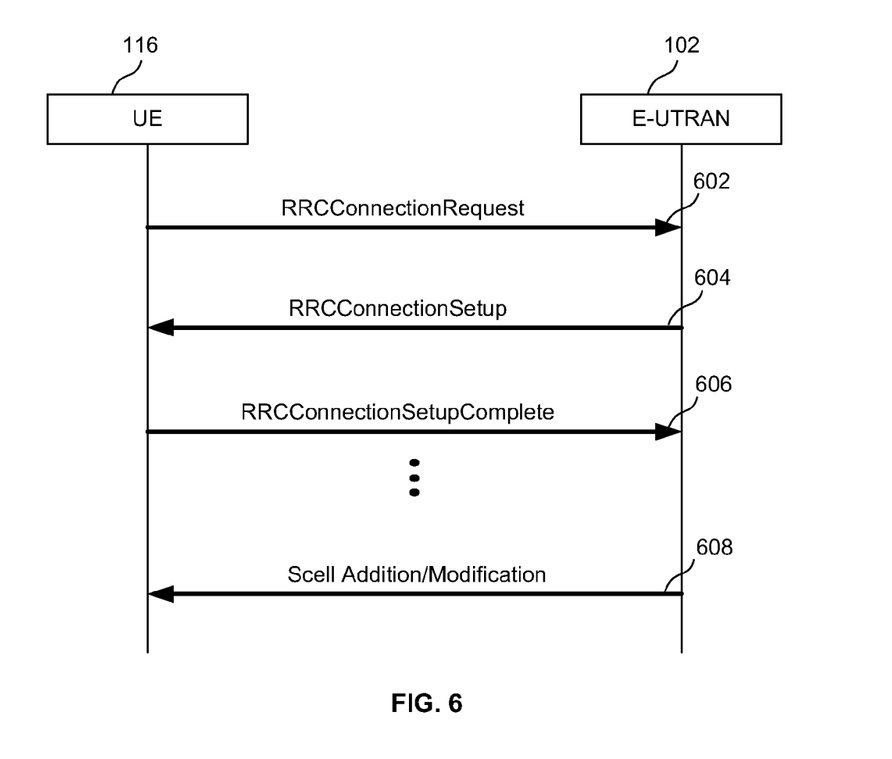
FIG. 6 illustrates an example timing diagram relating to the flow diagram of FIG. 5 according to some embodiments.

In another embodiment, radio resource control (RRC) dedicated signaling with additional parameters relating to the configurable extension carrier is used to specify configuration information of the extension carrier. In contrast to the SIB embodiment described above—in which a new dedicated SIB relating to the configurable extension carrier is broadcast to all of the UEs 116 via radio frame(s)—this embodiment implements a unicast downlink scheme using RRC dedicated signaling via radio frame(s) to select ones of the UEs 116 within the first cell 104. FIG. 5 illustrates an example flow diagram 500 for configuring an extension carrier for the first eNodeB 102 using RRC dedicated signaling according to some embodiments. FIG. 6 illustrates an example timing diagram for configuring the extension carrier using the RRC dedicated signaling according to some embodiments. FIG. 5 is described below in conjunction with FIG. 6.

At a block 502, after an initial connection is established between a given UE 116 and the first eNodeB 102 on the anchor/primary cell (Pcell), e.g., the stand-alone carrier operating at the first carrier frequency 112, the first eNodeB 102 exchanges RRC connection signaling with the given UE 116 located within the first cell 104 in preparation of obtaining configurable extension carrier information. The RRC connection signaling (also referred to as RRC signaling to establish a RRC connection or RRC signaling to establish a connection) comprises RRCConnectionRequest, RRCConnectionSetup, and RRCConnectionSetupComplete signaling. The given UE 116 first generates and transmits an RRCConnectionRequest signaling to the first eNodeB 102 to request a connection (communication 602). In response, the first eNodeB 102 transmits an RRCConnectionSetup signaling to the given UE 116, which provides information to establish a connection (communication 604). Last, the given UE 116 returns an RRCConnectionSetupComplete signaling to the first eNodeB 102 confirming a successful connection (communication 606). (See 3GPP TS 36.331 Version 10.2.0, E-UTRA Radio Resource Control (RRC): Protocol Specification (Release 10), June 2011.) The RRC connection signaling information is included in downlink subframes of radio frame(s).

Establishing such a connection occurs for a variety of reasons including, but not limited to, the given UE 116 being turned on within the first cell 104, the given UE 116 moves into the first cell 104 from another cell (e.g., the second cell 108), the given UE 116 loses an existing connection with the eNodeB 102 and attempts to reestablish a connection, and the like. In some embodiments, the given UE 116 may initiate the RRCConnectionRequest signaling to obtain additional bandwidth and/or better reception. For example, poor coverage or significant interference being experienced by the given UE 116 may prompt the UE 116 to transmit the RRCConnectionRequest signaling.

Once a connection has been established, the first eNodeB 102 monitors the Pcell's load relative to the given UE's 116 request (block 504). The given UE's 116 request comprises the communication load associated with or attributable to the UE 116 including, but not limited to, the data volume of the UE's uplink request (e.g., loading photos to a website, sending a text message), the data volume of the UE's downlink request (e.g., downloading or watching videos, watching long videos such as full length movies, downloading an app), or other requests by the given UE 116 that contributes to the bandwidth limitation of the Pcell in aggregate with all the other bandwidth demands on the Pcell from other UEs 116, eNodeBs, or other components within the wireless communications network 100. The Pcell load can also comprise the Pcell's effective load or load capacity factoring in network conditions. For example, if there is significant interference or coverage holes present simultaneous with the given UE's 116 request, the Pcell's load capacity is less than it otherwise would be.

Overall, the first eNodeB 102 determines if the given UE 116 and/or the network 100 would benefit from at least some of the UE's 116 request being fulfilled using an extension carrier based on load information associated with at least the Pcell and the given UE 116. The first eNodeB 102 may perform this monitoring step when the given UE 116 is of a sufficient release for the extension carrier to be accessible to that UE 116. For example, if the given UE 116 is an older model incapable of accessing the extension carrier, then the configuration information relating to the extension carrier need not be provided to that UE 116 even if the UE could benefit from using the extension carrier. In some instances, the older model UE may not be configured to expect or even understand extension carrier configuration information.

If the first eNodeB 102 determines that connection to an extension carrier is not beneficial (unnecessary or otherwise not desired) for the given UE 116 (block 506, no branch 508), then the first eNodeB 102 may continue to monitor load relative to the UE request (back to block 504). Otherwise (yes branch 510), the first eNodeB 102 transmits RRC signal information relating to configuring the extension carrier to the given UE 116 in downlink subframe(s) of at least one radio frame (block 512).

The downlink control channels/signals of the configurable extension carrier can be included in a dedicated RRC secondary cell (Scell) Addition/Modification signaling by the first eNodeB 102 and provided to the given UE 116 (communication 608). The dedicated RRC Scell Addition/Modification signaling comprises a new (or special or additional) RRC signaling to the traditional RRC signalings specifically for the purposes of specifying the configurable extension carrier. An example Scell Addition/Modification signaling including the parameters of the configuration extension carrier is provided below.

```
SCell Addition/Modification::= SEQUENCE {
    extensionCarrier-PSCH-r11      BOOLEAN,
    extensionCarrier-SSCH-r11      BOOLEAN,
    extensionCarrier-PBCH-r11      BOOLEAN,
    extensionCarrier-PCFICH-r11    BOOLEAN,
    extensionCarrier-PDCCH-r11     BOOLEAN,
    extensionCarrier-PHICH-r11     BOOLEAN,
    extensionCarrier-PCH-r11       BOOLEAN,
    extensionCarrier-CRS-r11       BOOLEAN,
    extensionCarrier-PRS-r11       BOOLEAN,
    extensionCarrier-CSI-RS-r11    BOOLEAN
    ...
}
```

The above parameters of the configurable extension carrier comprise the same configuration information included in the SIMB type information above, the parameters indicating the presence or absence of each of the downlink control channels/signals (PSCH, SSCH, PBCH, PCFICH, PDCCH, PHICH, PCH, CRS, PRS, and CSI-RS) of the particular extension carrier. The Scell Addition/Modification signaling is cell-specific (e.g., first cell 104) and is transmitted to the given UE 116 on the Pcell. Transmission of the Scell Addition/Modification signaling can be non-periodic or on an on-demand basis.

After the first eNodeB 102 provides the Scell Addition/Modification signaling, the first eNodeB 102 returns to monitoring load at the block 504. The given UE 116 can now access the extension carrier using the received configuration parameters. Depending on the UE 116 request, access to the extension carrier may improve performance, such as faster download, more consistent download, faster upload, etc., than it otherwise would experience without the extension carrier.

The flow diagram 500 is performed for each of the UEs 116 within the first cell 104 that is capable of accessing the extension carrier. Although FIGS. 5 and 6 are discussed above with respect to the first eNodeB 102, it is understood that the configuration encoding scheme similarly applies to the second eNodeB 106 and the other eNodeBs within the wireless communications network 100. In some embodiments, blocks 504, 506 may be performed prior to block 502.

Accordingly, an encoding scheme for defining the downlink control channels/signals of a configurable extension carrier within a LTE-Advanced network is disclosed. In one embodiment, the downlink control channels/signals of the configurable extension carrier are included in at least one radio frame on a Pcell according to a pre-determined broadcast time period of an eNodeB. The downlink control channels/signals of the configurable extension carrier are encoded in a new SIB transmitted on the DL-SCH, wherein the DL-SCH is included in the downlink subframes of the radio frame. In another embodiment, the downlink control channels/signals of the configurable extension carrier are included in a new RRC signaling. The new RRC signaling is included in at least one radio frame and is transmitted by an eNodeB on the Pcell to a particular UE within its coverage area, in response to an identified system improvement or efficiency from the particular UE using the extension carrier.

The term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention. As an example, the above scheme for configuring an extension carrier can also be used to configure a non-extension carrier (e.g., a stand-alone carrier).

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An enhanced node B (eNodeB) to operate within a wireless communications network, comprising:
   a processor to generate at least one radio frame including configuration parameters of an extension carrier according to a pre-determined time period, wherein a system information block (SIB)-type information dedicated to the configuration parameters of the extension carrier is included in the radio frame wherein SIB-type information includes configuration information to indicate presence or absence of downlink control signals of the extension carrier; and
   a transceiver to transmit the radio frame according to the pre-determined time period on a first carrier operating at a first carrier frequency, wherein the extension carrier comprises a second carrier operating at a second carrier frequency and a carrier incapable of operating without the first carrier.

2. The eNodeB of claim 1, wherein the pre-determined time period comprises a broadcast time period of the eNodeB on the first carrier.

3. The eNodeB of claim 1, wherein the configuration parameters of the extension carrier comprise downlink control signals of the extension carrier.

4. The eNodeB of claim 1, wherein the transceiver transmits the SIB-type information on a downlink shared channel (DL-SCH) included in the radio frame.

5. The eNodeB of claim 1, wherein the radio frame is structured for time division duplex (TDD) mode operation in a 3rd Generation Partnership Project (3GPP) long term evolution (LTE) network.

6. The eNodeB of claim 1, wherein the radio frame is structured for frequency division duplex (FDD) mode operation in a 3rd Generation Partnership Project (3GPP) long term evolution (LTE) network.

7. The eNodeB of claim 1, wherein the first carrier and the extension carrier comprise component carriers of a carrier aggregation (CA).

8. An enhanced node B (eNodeB) to operate within a wireless communications network, the eNodeB to:
   generate at least one radio frame including configuration parameters of an extension carrier, wherein a radio resource control (RRC) information dedicated to the configuration parameters of the extension carrier is included in the radio frame wherein RRC information includes configuration information to indicate presence or absence of downlink control signals of the extension carrier; and
   transmit the radio frame on a first carrier operating at a first carrier frequency to a user equipment (UE), wherein the extension carrier comprises a second carrier operating at a second carrier frequency and a carrier incapable of operating without the first carrier.

9. The eNodeB of claim 8, wherein the configuration parameters of the extension carrier comprise downlink control signals of the extension carrier.

10. The eNodeB of claim 8, wherein the eNodeB is to transmit RRC connection information to connect the eNodeB and the UE on the first carrier prior to transmission of the radio frame including the RRC information.

11. The eNodeB of claim 8, wherein the eNodeB is to generate the RRC information based on at least one of a load information associated with the first carrier and the UE.

12. The eNodeB of claim 8, wherein the wireless communications network comprises a 3rd Generation Partnership Project (3GPP) long term evolution (LTE)-Advanced network.

13. A method for communicating configuration parameters of an extension carrier, the method comprising:
   transmitting, by an enhanced node B (eNodeB), at least one radio frame including the configuration parameters of the extension carrier, wherein at least one of a system information block (SIB)-type information dedicated to the configuration parameters of the extension carrier is included in the radio frame, and a radio resource control (RRC) information dedicated to the configuration parameters of the extension carrier is included in the radio frame and selectively transmitted to an user equipment (UE), wherein at least one of the SIB-type information and the RRC information includes configuration information to indicate presence or absence of downlink control signals of the extension carrier.

14. The method of claim 13, wherein the transmitting of the radio frame comprises transmitting the SIB-type information on a downlink shared channel (DL-SCH) included in the radio frame.

15. The method of claim 13, wherein the radio frame is structured for time division duplex (TDD) mode operation in a 3rd Generation Partnership Project (3GPP) long term evolution (LTE) network.

16. The method of claim 13, wherein the radio frame is structured for frequency division duplex (FDD) mode operation in a 3rd Generation Partnership Project (3GPP) long term evolution (LTE) network.

17. The method of claim 13, wherein the transmitting of the radio frame comprises transmitting the radio frame including the RRC information subsequent to transmitting RRC connection information between the eNodeB and the UE.

18. The method of claim 13, wherein the transmitting of the radio frame comprises transmitting on a primary cell operating at a first carrier frequency.

19. The method of claim 18, further comprising determining to transmit the radio frame including the RRC information based on load information associated with at least one of the primary cell and the UE.

20. The method of claim 18, wherein the primary cell and the extension carrier comprise component carriers of a carrier aggregation (CA), the primary cell comprising a stand-alone capable carrier and the extension carrier comprising a carrier that cannot operate without the stand-alone capable carrier being included in the CA.

21. The method of claim 13, wherein the transmitting of the radio frame including the RRC information comprises transmitting to the UE having a configuration capable of accessing the extension carrier.

22. An user equipment (UE) to operate within a wireless communications network, the UE to:
receive at least one radio frame including configuration parameters of an extension carrier from a base station on a first carrier operating at a first carrier frequency, wherein the extension carrier comprises a second carrier operating at a second carrier frequency, the extension carrier unable to operate without the first carrier, wherein at least one of a system information block (SIB)-type information dedicated to the configuration parameters of the extension carrier is included in the radio frame, and a radio resource control (RRC) information dedicated to the configuration parameters of the extension carrier is included in the radio frame and selectively received by the UE), wherein at least one of the SIB-type information and the RRC information includes configuration information to indicate presence or absence of downlink control signals of the extension carrier.

23. The UE of claim 22, wherein the SIB-type information provided on a downlink shared channel (DL-SCH) of the radio frame.

24. The UE of claim 22, wherein the radio frame is received in accordance with a pre-determined broadcast time period.

25. The UE of claim 22, wherein the radio frame is structured for time division duplex (TDD) mode operation in a 3rd Generation Partnership Project (3GPP) long term evolution (LTE) network.

26. The UE of claim 22, wherein the radio frame is structured for frequency division duplex (FDD) mode operation in a 3rd Generation Partnership Project (3GPP) long term evolution (LTE) network.

* * * * *